United States Patent
Lee et al.

(10) Patent No.: US 10,232,835 B2
(45) Date of Patent: Mar. 19, 2019

(54) BRAKE SYSTEM FOR VEHICLE

(71) Applicants: Hyundai Motor Company, Seoul (KR); Kia Motors Corporation, Seoul (KR)

(72) Inventors: Joung Hee Lee, Suwon-si (KR); Jong Yun Jeong, Hwaseong-si (KR); Dong Yoon Hyun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 30 days.

(21) Appl. No.: 15/683,632

(22) Filed: Aug. 22, 2017

(65) Prior Publication Data

US 2018/0215362 A1 Aug. 2, 2018

(30) Foreign Application Priority Data

Feb. 2, 2017 (KR) .................. 10-2017-0015019

(51) Int. Cl.
*B60T 13/18* (2006.01)
*B60T 7/04* (2006.01)
*B60T 13/16* (2006.01)
*B60T 13/74* (2006.01)
*B60T 15/02* (2006.01)

(52) U.S. Cl.
CPC .............. *B60T 13/18* (2013.01); *B60T 7/042* (2013.01); *B60T 13/161* (2013.01); *B60T 13/745* (2013.01); *B60T 15/02* (2013.01)

(58) Field of Classification Search
CPC ........ B60T 13/18; B60T 7/042; B60T 13/161; B60T 13/785; B60T 15/02
See application file for complete search history.

(56) References Cited

U.S. PATENT DOCUMENTS

| | | | |
|---|---|---|---|
| 2013/0127240 A1* | 5/2013 | Noro | B60T 13/58 303/14 |
| 2014/0224525 A1 | 8/2014 | Cagle et al. | |
| 2015/0035351 A1* | 2/2015 | Okano | B60T 8/48 303/10 |
| 2018/0186353 A1* | 7/2018 | Lee | B60T 8/94 |
| 2018/0244251 A1* | 8/2018 | Masuda | B60T 8/17 |

* cited by examiner

*Primary Examiner* — Melanie Torres Williams
(74) *Attorney, Agent, or Firm* — Morgan, Lewis & Bockius LLP

(57) ABSTRACT

A brake system for a vehicle may include a brake input device configured to apply a brake input of a driver; a brake actuator including a first pump device and a second pump device for supplying a brake hydraulic pressure; a brake adjusting device, which includes a first chamber and a second chamber, and is operated so that the first chamber and the second chamber are connected to or blocked from each other; and wheel cylinders configured to generate brake power for each wheel by the brake hydraulic pressure generated in the brake actuator, wherein the brake adjusting device blocks the first chamber and the second chamber so that a brake hydraulic pressure supplied from the first pump device and a brake hydraulic pressure supplied from the second pump device are blocked from each other.

20 Claims, 3 Drawing Sheets

BRAKE SYSTEM FOR VEHICLE

CROSS-REFERENCE TO RELATED APPLICATION

The present application claims priority to Korean Patent Application No. 10-2017-0015019 filed on Feb. 2, 2017, the entire contents of which are incorporated herein for all purposes by this reference.

BACKGROUND

Field of the Invention

The present invention relates to a brake system for a vehicle, and more particularly, to a brake-by-wire brake system for a vehicle, which is capable of independently controlling braking power of wheels of the vehicle.

Description of Related Art

Recently, a brake-by-wire technology, which controls a brake system by adopting an electronic control system, is applied to the brake system of a vehicle, instead of a previously known general hydraulic control system.

The electronic control type brake system generates required hydraulic pressure according to a braking intention of a driver by use of an electric motor, and transmits the hydraulic pressure generated by the driving of the motor to a wheel brake (wheel cylinders) of each wheel to generate braking power.

The electronic control type brake system controlling hydraulic pressure with an electronic actuator is commonly referred to as an electro-hydraulic brake system (EHB).

The EHB easily individually controls braking power generated in each wheel to easily implement a function, such as an electronic stability control (ESC) or an anti-lock brake system (ABS).

In the typical EHB, a pump, in which rotational force is converted to straight force during the driving of the motor to operate a piston forward and backward, and the piston presses brake oil within a chamber of a cylinder to form hydraulic pressure, is widely used as the electronic actuator.

The EHB, pedal stroke according to an operation of a pedal by a driver is detected through a sensor, and then braking power of each wheel is adjusted with hydraulic pressure generated by the pump through the driving of the motor.

The EHB is provided with a pedal simulator, which enables a driver to feel pedal pressure like that in a general hydraulic brake system.

Accordingly, when the driver steps and presses a pedal connected to a backup master cylinder, a hydraulic pressure of the brake oil inside the backup master cylinder is increased, and the hydraulic pressure of the backup master cylinder is transmitted to the pedal simulator through a pedal hydraulic pressure line to generate a pedal feel.

When the driver steps the brake pedal, a control unit calculates a target hydraulic pressure desired by the driver based on a driver pedal input value (brake input value), that is, a pedal stroke value, detected through a brake pedal sensor (pedal stroke sensor), and subsequently controls the driving of the motor according to the calculated target hydraulic pressure and the pump generates hydraulic pressure, thereby transmitting the hydraulic pressure generated by the pump to each wheel cylinders and obtaining desired braking power.

US Patent Application Laid-Open No. 2014-0224525 (hereinafter, Patent Document 1) discloses an electronic brake, which is capable of controlling four wheels by one motor.

Patent Document 1 discloses a brake system including a main motor, which controls four wheels during a normal operation, and a plurality of valves installed in a hydraulic pressure line at each wheel side. Particularly, in Patent Document 1, an auxiliary motor, which deals with a failure when the main motor has a failure, is installed. The auxiliary motor configured for dealing with the failure of the main motor is operated only when the main motor has a failure, thereby disadvantageously increasing vehicle weight and manufacturing costs.

There is a problem in that a separate brake system for implementing an electronic parking brake function, in addition to the control of a brake pressure of each wheel, needs to be applied.

The information disclosed in this Background of the Invention section is only for enhancement of understanding of the general background of the invention and may not be taken as an acknowledgement or any form of suggestion that this information forms the conventional art already known to a person skilled in the art.

BRIEF SUMMARY

Various aspects of the present invention are directed to providing a brake system for a vehicle, which is configured for simplifying a complex brake system structure including a plurality of valve elements, and effectively controlling brake pressure of each wheel.

Various aspects of the present invention are directed to providing a brake system for a vehicle, including: a brake input device configured to apply a brake input of a driver; a brake actuator including a first pump device and a second pump device for supplying a brake hydraulic pressure; a brake adjusting device, which includes a first chamber and a second chamber, and is operated so that the first chamber and the second chamber are connected to or blocked from each other; and wheel cylinders configured to generate brake power for each wheel by the brake hydraulic pressure generated in the brake actuator, in which the brake adjusting device blocks the first chamber and the second chamber so that a brake hydraulic pressure supplied from a first pump device and a brake hydraulic pressure supplied from a second pump device are blocked from each.

In an exemplary embodiment, each of the first pump device and the second pump device may include a main motor and a main piston.

In another exemplary embodiment, the brake adjusting device may include: a housing; a hollow piston, which is accommodated inside the housing and is movable forwards and backwards therein; and a stopper, which is formed inside the housing to block the first chamber and the second chamber as being in contact with the hollow piston.

In still another exemplary embodiment, the brake adjusting device may further include a sub motor configured to provide driving force to the hollow piston.

In yet another exemplary embodiment, the brake adjusting device may further include a spindle for transmitting rotational force of the sub motor to the hollow piston.

In still yet another exemplary embodiment, the spindle may be screwed to the hollow piston In a further exemplary embodiment, a protruded part is formed along an internal circumference of the hollow piston, and the first chamber and the second chamber may be divided based on the protruded part.

In another further exemplary embodiment, the stopper may include a body part extended from the housing and a head part formed at one end portion of the body part.

In still another further exemplary embodiment, an external area of an upper surface of the head part of the stopper may be formed to be blocked by the protruded part formed along an internal circumference of the hollow piston.

In yet another further exemplary embodiment, a sealing member may be mounted in the external area of the upper surface of the head part of the stopper.

In still yet another further exemplary embodiment, the first pump device or the second pump device may be connected to a master cylinder by a pedal hydraulic line, and a normally open valve may be disposed in the pedal hydraulic line.

In a still further exemplary embodiment, the brake actuator and the brake adjusting device may be connected by a hydraulic transmission line, and the brake adjusting device and the wheel cylinders may be connected by a hydraulic supply line.

In a yet still further exemplary embodiment, the brake system may further include a control device configured to control the brake actuator and the brake adjusting device.

In a yet still further exemplary embodiment, when left and right brake power is equally controlled, the first chamber and the second chamber may be controlled to be connected by the control device.

In a yet still further exemplary embodiment, when left and right brake power is independently controlled, the first chamber and the second chamber may be controlled to be blocked by the control device.

In a yet still further exemplary embodiment, at least four through holes may be formed in the hollow piston and the through holes are positioned to be connected to the hydraulic supply line and the hydraulic transmission line by a movement of moving the hollow piston.

In a yet still further exemplary embodiment, the same number of housing holes as the number of through holes may be formed in the housing, and the hollow piston may be positioned within the housing so that positions of the through holes are matched with positions of the housing holes.

In a yet still further exemplary embodiment, in the state where the hollow piston is in contact with the stopper, centers of the through holes may be configured not to centers of the housing holes.

In a yet still further exemplary embodiment, a size of the through hole may be greater than a size of the housing hole.

In a yet still further exemplary embodiment, a second sealing member may be inserted between an internal wall of the housing and the hollow piston.

According to the exemplary embodiment of the present invention, it is possible to independently control a brake pressure of each wheel by two motors, improving vehicle-based independent control performance in the case of an anti-lock brake system (ABS) control and an electronic stability control (ESC) control.

According to an exemplary embodiment of the present invention, it is possible to independently control each wheel without installing a plurality of valves, simplifying a structure of the brake system, and decreasing valve operation noise and decreasing noise generable during the brake.

According to an exemplary embodiment of the present invention, it is possible to remove a deviation between left and right brake power during the emergency brake, preventing a vehicle pull.

According to the exemplary embodiment of the present invention, it is possible to implement a brake power maintenance function including auto vehicle hold (AVH), by use of an auto-lock function of a screw and a nut in the state where a motor is not driven, decreasing energy consumption and contributing to improving durability of the motor.

Other aspects and exemplary embodiments of the invention are discussed infra.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the invention are discussed infra.

BRIEF DESCRIPTION OF THE DRAWINGS

FIG. 3 is a diagram illustrating an operation of the brake adjusting device when left and right brake power is equally controlled;

FIG. 4 is a diagram illustrating an operation of the brake adjusting device when left and right brake power is independently controlled; and FIG. 5 is a diagram illustrating an operation of the brake adjusting device when brake power of a wheel is controlled to be maintained.

Figure 1:
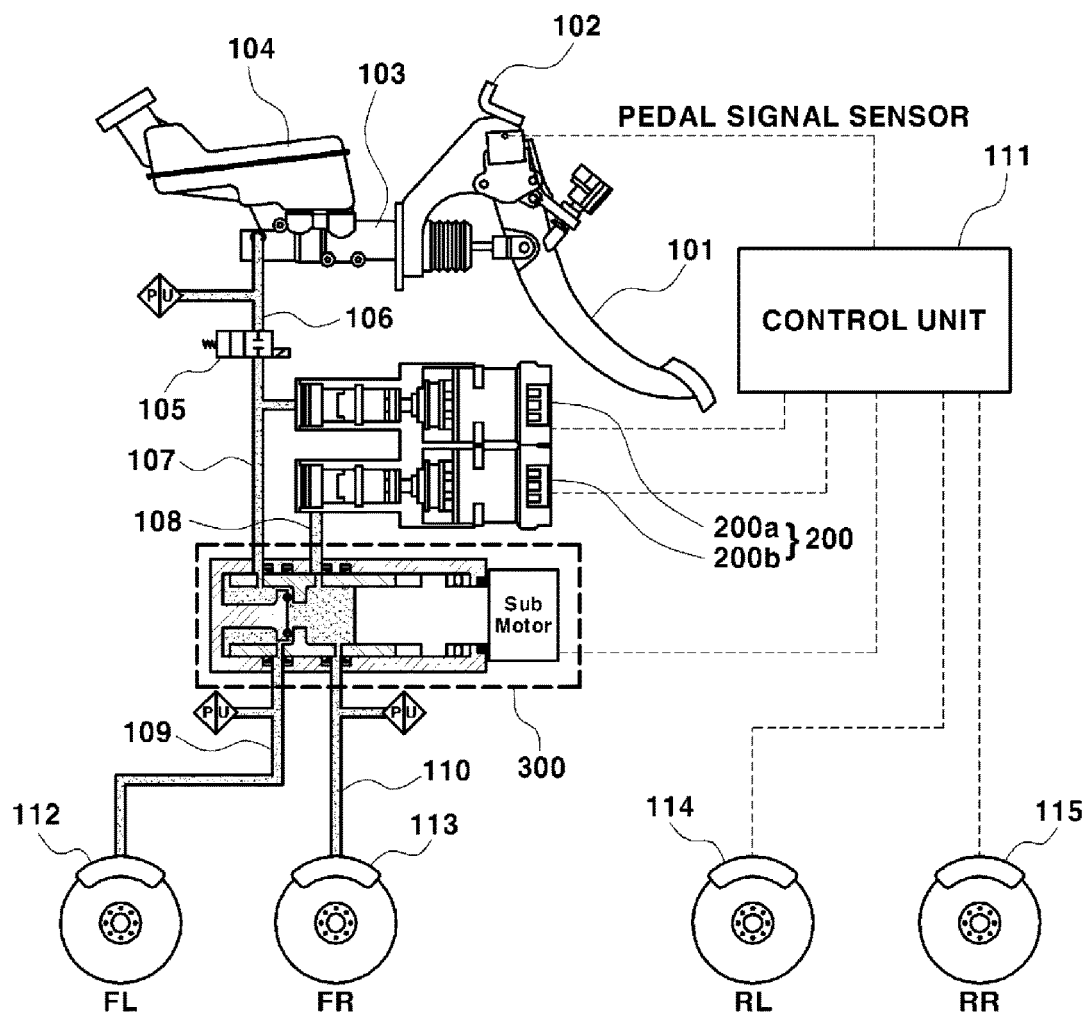
FIG. 1 is a diagram schematically illustrating a configuration of a brake system for a vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention presents a brake system for a vehicle, which is configured for discriminating a general brake state from a state, in which left and right brake power needs to be independently controlled, for implementing an anti-lock brake system (ABS) or electronic stability control (ESC) function, and selectively and immediately changing a control mode appropriate to each state.

To this end, the present invention presents a mode, in which left and right brake power of front wheels is equally controlled, and a mode, in which left and right brake power of front wheels is independently controlled, based on an example, in which a brake system for a vehicle is disposed in front wheels, and hardware formed to selectively implement each control mode in a brake system for a vehicle according to an exemplary embodiment of the present invention.

Hereinafter, a brake system for a vehicle according to an exemplary embodiment of the present invention will be described in detail with reference to the accompanying drawings.

Figure 2:
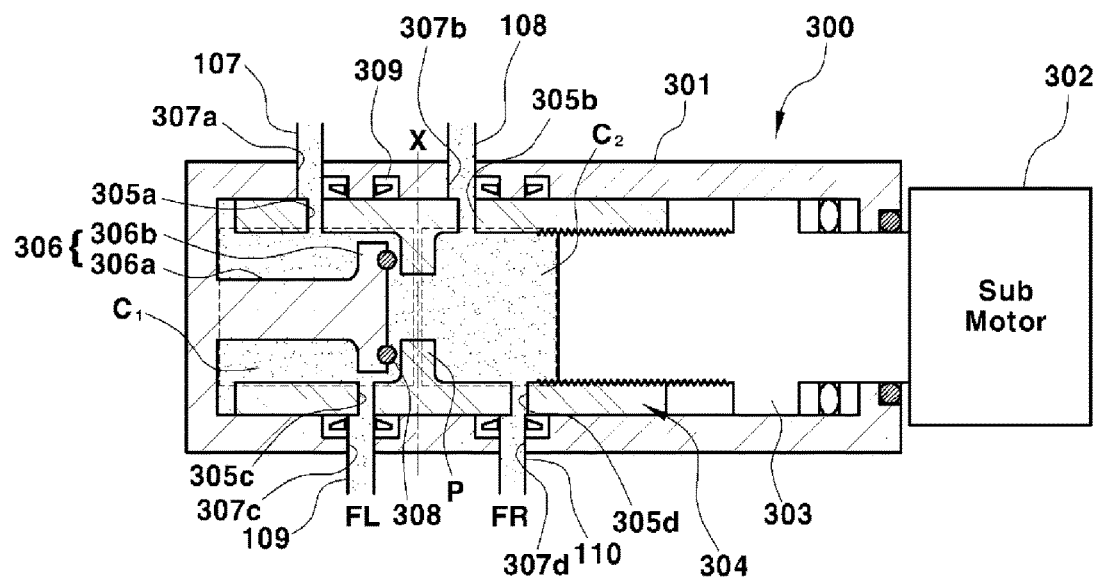
FIG. 2 is a diagram illustrating a brake adjusting device included in the brake system for the vehicle of FIG. 1.

FIG. 1 is a diagram schematically illustrating a configuration of a brake system for a vehicle according to an exemplary embodiment of the present invention, and FIG. 2 is a diagram illustrating only a brake adjusting device extracted from the example of FIG. 1.

As illustrated in FIG. 1, the brake system for the vehicle according to an exemplary embodiment of the present invention includes a brake pedal 101 that is a brake input device operated for braking a vehicle by a driver, a brake input detecting sensor 102 for detecting a brake input value through the brake pedal 101, a brake actuator 200 for generating brake hydraulic pressure, wheel cylinders 112 and 113, to which the brake hydraulic pressure generated by the brake actuator 200 is transmitted and which generates brake power for each wheel, and a brake adjusting device 300 positioned between the brake actuator 200 and the wheel cylinders 112 and 113. Further, hydraulic transmission lines 107 and 108 are formed between the brake actuator 200 and the brake adjusting device 300, and hydraulic supply lines 109 and 110 are formed between the brake adjusting device 300 and the wheel cylinders 112 and 113. Accordingly, brake hydraulic pressure generated by the brake actuator 200 is supplied to each of the wheel cylinders 112 and 113. Further, the brake actuator 200 and the brake adjusting device 300 are connected to a control device 111, and control a target brake pressure to be generated according to a signal of the brake input detection sensor 102 by the control device 111.

The brake actuator 200 may include a pair of pumping units 200a and 200b formed to supply brake hydraulic pressure to left and right wheel cylinders 112 and 113 of front wheels. To independently form a brake hydraulic pressure to each of the left and right front wheels based on a structure connected to the front wheels, the pair of pumping units 200a and 200b is included. The pair of pumping units may be divided into a first pump device 200a and a second pump device 200b.

The pair of pumping units 200a and 200b is formed to be connected to the wheel cylinder 112 of the front left wheel and the wheel cylinder 113 of the front right wheel, respectively, and is configured to independently or commonly control the brake pressures of the wheel cylinders 112 and 113 according to an operation of the brake adjusting device 300. A detailed operation of the brake adjusting device 300 will be described below.

Each of the pumping units 200a and 200b may include a main motor to generate a brake hydraulic pressure, and include a main piston moving forwards and backwards according to a rotation of the main motor. However, a configuration of the pump device is not limited to the example, and as long as the pump device has a configuration generating a brake hydraulic pressure and supplying the generated brake hydraulic pressure to the wheel cylinders through the hydraulic line, the pump device is applicable without a limit.

The brake adjusting device 300 may include a sub motor 302, a spindle 303 rotating by the sub motor 302, and a hollow piston 304 connected to the spindle 303 to move. The hollow piston 304 may be formed in a cylinder shape having a hole at a center thereof, but as long as the hollow piston 304 is movable forwards and backwards within a housing, the hollow piston 304 may also have another shape, other than the cylinder shape.

The spindle 303 and the hollow piston 304 are accommodated in the housing 301, and are configured to connect or separate the chambers inside the housing 301 while being selectively in contact with a stopper 306 formed within the housing 301 according to the forward and backward movement of the hollow piston 304.

In the instant case, the sub motor 302 is a configuration providing driving power for moving the hollow piston 304, and may be controlled by the control device 111.

That is, the control device 111 is formed to control the sub motor 302 of the brake adjusting device 300 and the main motors within the brake actuator 200 of the front wheel, and may also be formed to control a brake disposed at a rear wheel, for example, an electronic brake of the rear wheel, together in addition to the front wheel.

The brake pedal 101 is connected to a master cylinder 103 connected to an oil reservoir 104, in which brake oil is stored, and when a driver presses the brake pedal 101, hydraulic pressure is formed through the master cylinder 103 and the pedal hydraulic line 106 connected to the master cylinder 103. In the instant case, a pedal simulator for providing an appropriate pedal feel when the driver steps the brake pedal 101 may be embedded in the master cylinder 103.

A cut valve 105 may be disposed in the pedal hydraulic line 106, and the cut valve 105 may be formed of a normally open valve. Accordingly, when the brake is not performed, the cut valve 105 is in an open state, and when the brake is performed, the cut valve 105 is closed and the hydraulic pressure is not transmitted to the brake adjusting device 300 and the wheel cylinders.

Accordingly, when the driver steps the brake pedal for the brake, the brake actuator 200 is operated and thus the brake hydraulic pressure is transmitted to the wheel cylinders 112 and 113 of the front left and right wheels in the state where the cut valve is closed.

The brake hydraulic pressure generated from the pumping units 200a and 200b forming the brake actuator 200 passes through the brake adjusting device 300. The brake adjusting device 300 is formed to control a brake power control method for the front left and right wheels, which is achieved according to an adjustment of a position of the hollow piston 304 by controlling the sub motor 302 by the control device 111.

The hollow piston 304 is formed to simultaneously control connection states between the hydraulic transmission lines 107 and 108 connected to the pumping units 200a and 200b and the chambers of the brake adjusting device 300, and connection states between the hydraulic supply lines 109 and 110 connected to the wheel cylinders 112 and 113 and the chambers of the brake adjusting device 300. Further, the hollow piston 304 may be formed at adjust a connection state between the chambers of the brake adjusting device 300.

Figure 3:
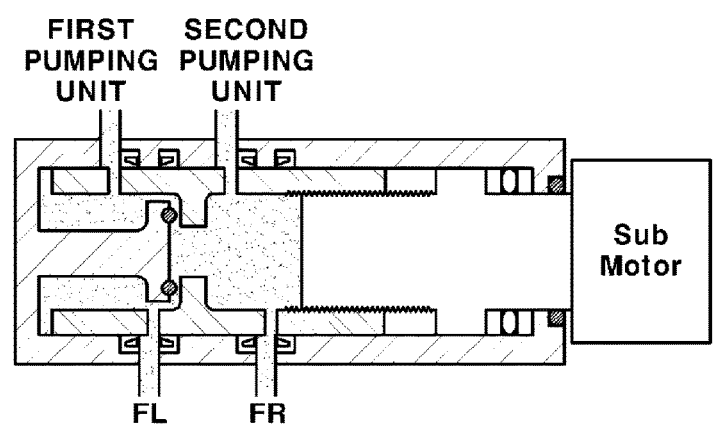
FIG. 3, FIG. 4, and FIG. 5 are diagrams illustrating the brake adjusting device included in the brake system for the vehicle according to the exemplary embodiment of the present invention.
Figure 4:
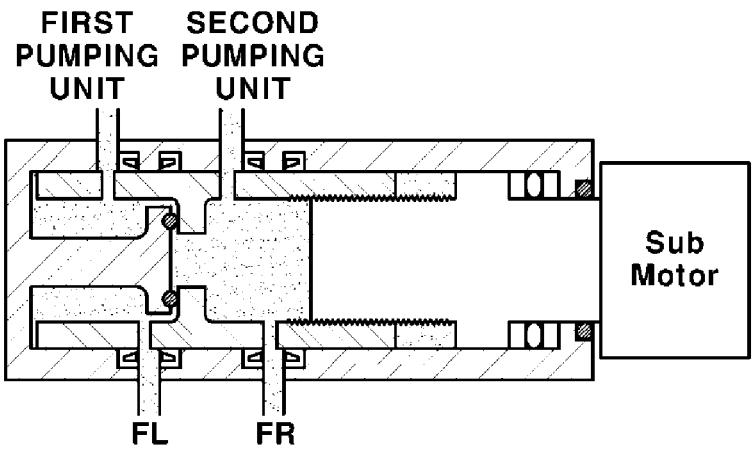
Figure 5:
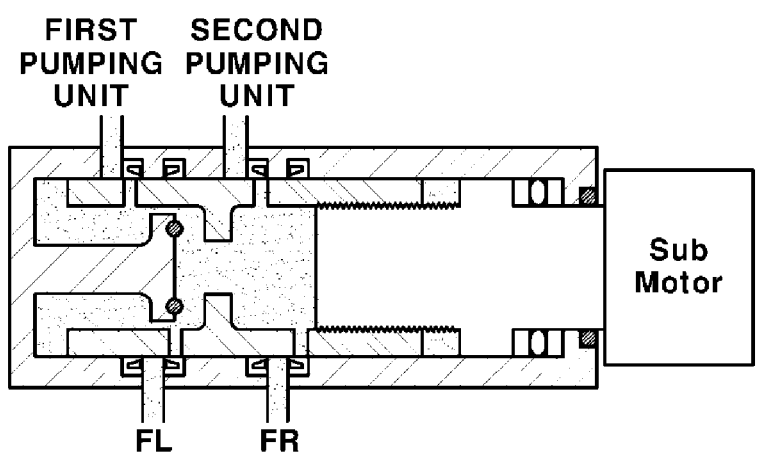

In relation to this, FIG. 3, FIG. 4, and FIG. 5 illustrate an example, in which the brake power control method is varied according to an operation of the brake adjusting device 300.

First, a configuration of the brake adjusting device 300 will be described with reference to FIG. 2. According to the present exemplary embodiment of the present invention, when the brake hydraulic pressure generated by the brake actuator 200 is transmitted to each of the wheel cylinders 112 and 113, an opening of the hydraulic line and a connection/separation between the internal chambers are selectively applied by the brake adjusting device 300. The brake adjusting device 300 is formed to simultaneously serve the first function of controlling a connection state between the internal chambers of the housing 301, and the second function of controlling the connection states between the hydraulic transmission lines 107 and 108 and the hydraulic supply lines 109 and 110. The first function and the second function need to be harmoniously applied in selectively implementing a mode, in which left and right brake power is commonly controlled, and a mode, in which left and right brake power is independently controlled.

As illustrated in FIG. 2, the brake adjusting device 300 includes the housing 301, and includes the spindle 303 and the hollow piston 304, which are positioned inside the housing 301 and move by the sub motor 302.

The sub motor 302 may be mounted outside the housing 301 as illustrated in FIG. 2, but a particular mounting position is not significant. However, the housing 301 has an internal space, which is dividable into two chambers, therein, so that the sub motor 302 needs to be formed to provide driving power facilitating the hollow piston 304 to move within the internal space.

To this end, according to the exemplary embodiment of the present invention, the spindle 303 is rotatably mounted in the sub motor 302, and the hollow piston 304 is connected to the spindle 303. In the instant case, the spindle 303 and the hollow piston 304 are engaged like a screw and a nut, and the hollow piston 304 is formed at act translation according to the rotation of the spindle 303. For example, when the sub motor 302 is forward rotated, the hollow piston 304 may be configured to move to the left side.

In the meantime, in relation to the first function, a protruded part P is formed at a center inside the hollow piston 304, and the stopper 306 is disposed inside the housing 301.

The protruded part P of the hollow piston 304 is formed to block left and right spaces while being in contact with the stopper 306 fixedly mounted to the internal side of the housing 301. In the instant case, the protruded part P divides the internal space of the housing 301 into two left and right chambers. For convenience of the description, based on a virtual line X connecting both sides of the protruded part, a left side s referred to as a first chamber and a right side is referred to as a second chamber.

As described above, the hollow piston 304 acts the translation by the sub motor 302, and in the instant case, a relative site variation with the stopper 306 mounted inside the housing 301 is generated.

As illustrated in FIG. 3, in the state where the stopper 306 is not in contact with the protruded part P of the hollow piston 304, the first chamber and the second chamber are in a connection state, that is, the state where a fluid is movable between the first chamber and the second chamber.

In the meantime, as illustrated in FIG. 4, when the stopper 306 is in contact with the protruded part P of the hollow piston 304, the first chamber and the second chamber are divided from each other and are in a blocked state where the fluid between the first chamber and the second chamber is not movable.

To implement the movement, the stopper 306 is formed of a body part 306a and a head part 306b, and the body part 306a is extended from one side surface of the first chamber of the housing 301 with a sufficient length so that the first chamber has a sufficient space. Further, the head part 306b is formed at an end portion of the other side of the extended body part 306a, and the head part 306b has a structure having a sufficient area to be appropriate to block the left and right chambers from each other. Accordingly, the stopper 306 according to the present exemplary embodiment has a shape like a mushroom, and may be formed to have the head part 306b having an expanded area.

The protruded part P of the hollow piston 304 protrudes from an entire internal circumference of the hollow piston 304 to have a shape corresponding to the shape of the head part 306b. In the instant case, a surface of the stopper 306 viewed from the protruded part P may have a shape completely covering an area of an external side of an upper surface of the head part 306b of the stopper 306. That is, when the head part 306b has a circular structure, the protruded part P is formed of a ring shape protruding toward the internal side of the hollow piston 304. Accordingly, the hollow part blocks the left and right chambers, that is, the first chamber and the second chamber, while forming a ring-shaped contact area with the circular head part 306b. In the example of FIG. 2, a first sealing member 308 is mounted at the head part 306b of the stopper 306, and a space between the chambers may be completely shield by the first sealing member 308. Further, for air tightness between the hollow piston 304 and the housing 301, a second sealing member 309 may be mounted.

A principle, in which a control mode is changed according to the block of the connection between the chambers or the connection between the chambers, is described below.

First, in a mode, in which left and right brake power of the front wheels is equally controlled, as illustrated in FIG. 3, the hollow piston 304 is distanced from the head part 306b of the stopper 306. That is, when the protruded part P of the hollow piston 304 is distanced from the head part 306b of the stopper 306 according to an operation of the sub motor 302, the first chamber and the second chamber are connected to each other. Accordingly, the first chamber and the second chamber are in a pressure balance state, and regardless of an individual size of the brake hydraulic pressure transmitted from the pumping units, a uniform brake hydraulic pressure is applied to the left and right wheel cylinders. When the hollow piston 304 is positioned like FIG. 3, it is possible to remove a deviation between the left and right brake power even in any brake state, for example, an emergency brake state, suppressing a vehicle pull.

As described above, an initial position for the hollow piston 304 may be set at a position, at which the left and right brake power is equally controllable, and based on the initial position, when the sub motor 302 rotates forward, the hollow piston 304 moves to the left side, and when the sub motor 302 rotates backward, the hollow piston 304 moves to the right side. The purpose of setting of the initial position is configured to easily control a position of the hollow piston 304 by the sub motor 302.

In the meantime, as illustrated in FIG. 4, when the hollow piston 304 moves to the left side and is in contact with the head part 306b of the stopper 306, the first chamber and the second chamber are separated from each other. Accordingly, the hydraulic pressures of the first chamber and the second chamber may be differently controlled, and thus, the left and right brake power may be independently controlled.

Accordingly, it is possible to independently control the left and right wheel cylinders by appropriately controlling the first pump device 200a of the first chamber and the second pump device 200b of the second chamber.

In the meantime, in relation to the second function, at least four through holes 305a, 305b, 305c, and 305d are formed in the hollow piston 304, and the through holes 305a, 305b, 305c, and 305d are positioned to be connected to the hydraulic lines. That is, as illustrated in FIG. 2, the two through holes 305a and 305b are formed at an upper side of the hollow piston 304, and the remaining two through holes 305c and 305d are formed at a lower side of the hollow piston 304. The two upper through holes 305a and 305b are provided for the hydraulic transmission lines 107 and 108 connected to the brake actuator 200, and the two lower through holes 305c and 305b are provided for the hydraulic supply lines 109 and 110 connected to the wheel cylinders 112 and 113.

Holes 307a, 307b, 307c, and 307d connected to the hydraulic transmission lines 107 and 108 and the hydraulic supply lines 109 and 110 are formed in the housing 301, and it is important that the holes 307a, 307b, 307c, and 307d of the housing are positioned to be matched with the through holes 305a, 305b, 305c, and 305d, respectively.

According to the exemplary embodiment of the present invention, as illustrated in FIG. 3 and FIG. 4, it is important to maintain the connection state between the hydraulic transmission lines 107 and 108 and the hydraulic supply lines 109 and 110 even though the hollow piston 304 moves, that is, the positions of the through holes 305a, 305b, 305c, and 305d of the hollow piston 304 are changed.

The reasons is that when the vehicle is in the brake state, the brake hydraulic pressure generated in the brake actuator 200 needs to be supplied to the wheel cylinders regardless of the control mode.

To this end, based on the state where the chambers are blocked from each other of FIG. 4, that is, the state where the stopper 306 is in contact with the hollow piston 304, the centers of the through holes 305a, 305b, 305c, and 305d of the hollow piston 304 may not completely correspond to the centers of the holes 307a, 307b, 307c, and 307d of the housing. That is, as illustrated in FIG. 4, the centers of the through holes 305a, 305b, 305c, and 305d may be set in the state relatively leaning to the left side compared to the centers of the holes 307a, 307b, 307c, and 307d of the housing. In the instant case, as illustrated in FIG. 3, when the hollow piston 304 moves, the centers of the through holes 305a, 305b, 305c, and 305d may be positioned to lean to the right side with respect to the centers of the holes 307a, 307b, 307c, and 307d of the housing. As a result, even in any state of FIG. 3 and FIG. 4, the connection state of the hydraulic lines may be maintained.

Unlike the above example, a size of the through hole may be set to be greater than a size of the hole of the housing. In the instant case, the size of the through hole is relatively large, so that even though the hollow piston 304 moves, the connection state of the hydraulic lines may be maintained in a sufficient area.

In the meantime, in relation to the second function of the brake adjusting device 300, FIG. 5 exemplifies the case where the brake pressure of the wheel is controlled to be maintained. Here, the maintenance of the brake pressure of the wheel device that when brake power of a vehicle needs to be maintained, like the AVH function, the brake pressure applied to each wheel cylinder is controlled to be maintained.

To this end, in the present exemplary embodiment of the present invention, as illustrated in FIG. 5, the hollow piston 304 moves in the rear direction, so that the through holes 305a, 305b, 305c, and 305d and the holes 307a, 307b, 307c, and 307d of the housing are controlled to completely deviate and be positioned. That is, as illustrated in FIG. 5, the hollow piston 304 moves to the right side, so that an external wall of the hollow piston 304 covers the holes 307a, 307b, 307c, and 307d of the housing. Accordingly, the hydraulic transmission lines 107 and 108 and the hydraulic supply lines 109 and 110 are not connected to the first chamber and the second chamber through the through holes 305a, 305b, 305c, and 305d, so that the hollow piston 304 substantially completely blocks the hydraulic transmission lines 107 and 108 and the hydraulic supply lines 109 and 110.

Accordingly, the brake hydraulic pressure supplied to the wheel cylinders is blocked by the hollow piston 304, and the brake pressure of each wheel is maintained.

In maintaining the brake pressure of the wheel, the sub motor 302 may be continuously operate, but in the instant case, electrical energy for driving the sub motor 302 is continuously consumed, so that heating of the sub motor 302 is expected.

In the meantime, the brake pressure of the wheel may also be maintained by use of mechanical friction between the spindle 303 and the hollow piston 304 without driving the sub motor 302. That is, a screw fastening structure is formed between the spindle 303 and the hollow piston 304, and a pitch and a screw angle are set so that large force is applied to the screw fastening structure, implementing an auto-lock function.

In the instant case, when the sub mother 302 reversely rotates to move the hollow piston 304, the brake pressure of the wheel may be maintained even though the sub motor 302 is not operated any longer.

In the meantime, the exemplary embodiment of FIG. 1 presents the example, in which the brake actuator 200 and the brake adjusting device 300 for the front wheel are disposed, and the electronic brake is disposed in each of the left and right wheels in the case of the wheel cylinders 114 and 115 of the rear wheels. Accordingly, the brake control is performed by the brake adjusting device 300 in the front wheels, and the brake control is performed by the electronic brakes of the rear wheels. However, FIG. 1 is one example, and unlike FIG. 1, the brake actuator and the brake adjusting device may be disposed only at the rear wheel sides, or the brake actuator and the brake adjusting device may also be disposed at all of the front and rear wheels.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A brake system for a vehicle, comprising:
   a brake input device configured to apply a brake input of a driver;
   a brake actuator including a first pump device and a second pump device configured for supplying a brake hydraulic pressure;
   a brake adjusting device, which includes a first chamber and a second chamber, and is configured to be operated so that the first chamber and the second chamber are connected to or blocked from each other; and
   wheel cylinders configured to generate brake power for each wheel by the brake hydraulic pressure generated in the brake actuator,
   wherein the brake adjusting device is configured to block the first chamber and the second chamber such that a brake hydraulic pressure supplied from the first pump device and a brake hydraulic pressure supplied from the second pump device are blocked from each other.

2. The brake system of claim 1, wherein each of the first pump device and the second pump device includes a main motor and a main piston.

3. The brake system of claim 1, wherein the brake adjusting device includes:
   a housing;
   a hollow piston, which is accommodated inside the housing and is configured to be movable forwards and backwards therein; and
   a stopper, which is formed inside the housing to block the first chamber and the second chamber as being in contact with the hollow piston.

4. The brake system of claim 3, wherein the brake adjusting device further includes a sub motor configured to provide driving force to the hollow piston.

5. The brake system of claim 4, wherein the brake adjusting device further includes a spindle configured for transmitting rotational force of the sub motor to the hollow piston.

6. The brake system of claim 5, wherein the spindle is screwed to the hollow piston.

7. The brake system of claim 3, wherein a protruded part is formed along an internal circumference of the hollow piston, and the first chamber and the second chamber are divided by the protruded part.

8. The brake system of claim 3, wherein the stopper includes a body part extended from the housing and a head portion formed at a first end portion of the body part.

9. The brake system of claim 8, wherein an external area of an upper surface of the head portion of the stopper is formed to be blocked by the protruded part.

10. The brake system of claim 9, wherein a first sealing member is mounted in the external area of the upper surface of the head portion of the stopper.

11. The brake system of claim 1, wherein the first pump device or the second pump device is connected to a master cylinder by a pedal hydraulic line and a normally open valve is disposed in the pedal hydraulic line.

12. The brake system of claim 1, wherein the brake actuator and the brake adjusting device are connected by a hydraulic transmission line, and the brake adjusting device and the wheel cylinders are connected by a hydraulic supply line.

13. The brake system of claim 1, further including:
   a control device configured to control the brake actuator and the brake adjusting device.

14. The brake system of claim 13, wherein, when left and right brake power is equally controlled, the first chamber and the second chamber are configured to be controlled to be connected by the control device.

15. The brake system of claim 13, wherein, when left and right brake power is independently controlled, the first chamber and the second chamber are configured to be controlled to be blocked by the control device.

16. The brake system of claim 12, wherein the hollow piston has at least four through holes, and the through holes are disposed to be connected to the hydraulic supply line and the hydraulic transmission line by a movement of the hollow piston.

17. The brake system of claim 16, wherein a same number of housing holes as a number of through holes is formed in the housing, and the hollow piston is disposed within the housing wherein positions of the through holes are matched with positions of the housing holes.

18. The brake system of claim 17, wherein in a state where the hollow piston is in contact with the stopper, centers of the through holes are configured not to correspond centers of the housing holes.

19. The brake system of claim 17, wherein a size of the through holes is greater than a size of the housing holes.

20. The brake system of claim 3, wherein a second sealing member is configured to be inserted between an internal wall of the housing and the hollow piston.

* * * * *